(12) United States Patent
Militz

(10) Patent No.: US 8,245,855 B2
(45) Date of Patent: Aug. 21, 2012

(54) THREAD SYSTEM FOR INSTALLING IN DRINKING WATER SYSTEMS AND OTHER LIQUID-GUIDING SYSTEMS

(75) Inventor: Detlef Militz, Dahlwitz-Hoppegarten (DE)

(73) Assignee: Silvertex AG, Heimberg (CH)

( * ) Notice: Subject to any disclaimer, the term of this patent is extended or adjusted under 35 U.S.C. 154(b) by 245 days.

(21) Appl. No.: 11/663,902

(22) PCT Filed: Sep. 26, 2005

(86) PCT No.: PCT/DE2005/001730
§ 371 (c)(1), (2), (4) Date: Mar. 26, 2007

(87) PCT Pub. No.: WO2006/034701
PCT Pub. Date: Apr. 6, 2006

(65) Prior Publication Data
US 2008/0087600 A1 Apr. 17, 2008

(30) Foreign Application Priority Data
Sep. 27, 2004 (DE) .................... 20 2004 015 240 U

(51) Int. Cl.
*C02F 1/50* (2006.01)
*B01D 39/08* (2006.01)
*B01D 39/00* (2006.01)

(52) U.S. Cl. ........ 210/501; 210/505; 210/507; 210/508; 210/490

(58) Field of Classification Search ........................ None
See application file for complete search history.

(56) References Cited

U.S. PATENT DOCUMENTS
4,071,636 A * 1/1978 Nishino et al. ................ 427/244
(Continued)

FOREIGN PATENT DOCUMENTS
DE       41 19 173 A1     1/1992
(Continued)

OTHER PUBLICATIONS
Machine translation of WO 02/061189 (Aug. 8, 2002).*
(Continued)

*Primary Examiner* — Nam Nguyen
*Assistant Examiner* — Madeline Gonzalez
(74) *Attorney, Agent, or Firm* — Collard & Roe, P.C.

(57) ABSTRACT

The invention relates to a thread system (1) for installing in drinking water systems and other liquid-guiding systems (T), said thread system having a multidimensional structure formed by at least one thread (200) which exhibits a germicidal activity in a damp environment due to oligodynamic metal parts in the thread. According to the invention, the thread system (1) is provided with a first surface structure (10), and a plurality of spacer thread elements (11) extends perpendicularly to the surface structure (10) in such a way that the thread system (1) forms an elastically deformable three-dimensional spacer structure, the thread (200) with the germicidal activity being arranged in the surface structure (10) and/or in the region of the spacer thread elements (11). The elastic properties enable the same thread system (11) to be used for a plurality of different drinking water systems. A volume unit of the thread system (1), which is larger than the spatial volume in the assembly region of the drinking water system, is introduced into the assembly region in a compressed manner. The thread system (1) is then left to expand, and sticks, with the surface structure (10) and the fibrous spacer sections (11), to the wall sections of the drinking water system (T) which define the spacial volume.

12 Claims, 3 Drawing Sheets

U.S. PATENT DOCUMENTS

| | | | |
|---|---|---|---|
| 4,999,109 A * | 3/1991 | Sabre | 210/244 |
| 5,002,667 A * | 3/1991 | Kutowy et al. | 210/321.75 |
| 5,985,141 A * | 11/1999 | Murphy, Jr. | 210/205 |
| 6,270,674 B1 * | 8/2001 | Baurmeister et al. | 210/649 |
| 7,175,762 B1 * | 2/2007 | Noca et al. | 210/500.22 |
| 7,422,121 B2 | 9/2008 | Stadelmann | |
| 2002/0092810 A1 * | 7/2002 | King | 210/501 |
| 2003/0121855 A1 * | 7/2003 | Kopp | 210/650 |
| 2004/0226886 A1 * | 11/2004 | Hester et al. | 210/649 |
| 2005/0035057 A1 | 2/2005 | Zikeli et al. | |
| 2007/0012606 A1 * | 1/2007 | Shaw et al. | 210/163 |

FOREIGN PATENT DOCUMENTS

| | | |
|---|---|---|
| DE | 690 01 392 T2 | 11/1993 |
| DE | 42 18 860 A1 | 12/1993 |
| DE | 44 16 501 A1 | 11/1995 |
| DE | 100 29 082 A1 | 1/2002 |
| DE | 101 40 772 A1 | 3/2003 |
| EP | 0 402 661 B1 | 4/1993 |
| EP | 1 134 012 A | 9/2001 |
| GB | 1 419 780 A | 12/1975 |
| GB | 1 449 239 A | 9/1976 |
| JP | 10-296271 A | 11/1998 |
| WO | WO 02/061189 A2 | 8/2002 |

OTHER PUBLICATIONS

International Search Report.
Council Directive 98/83/EC of Nov. 3, 1998 on the quality of water intended for human consumption, Office Journal of the European Communities, pp. L 330/32-L 330/54, Dec. 5, 1998. (Spec., p. 1).

* cited by examiner

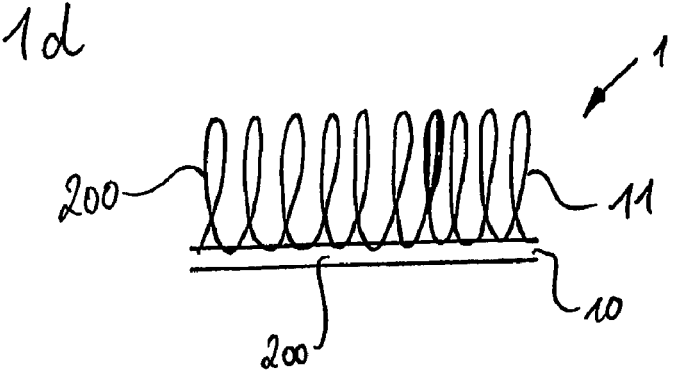
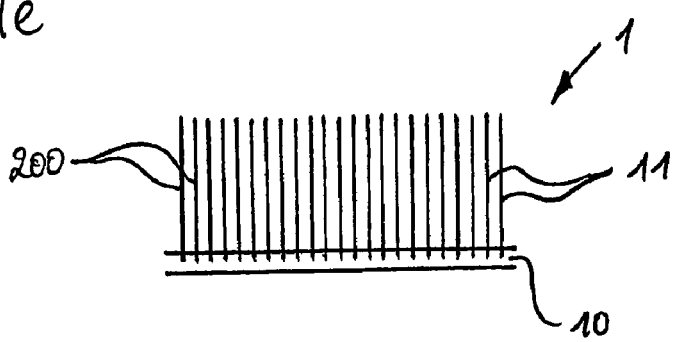
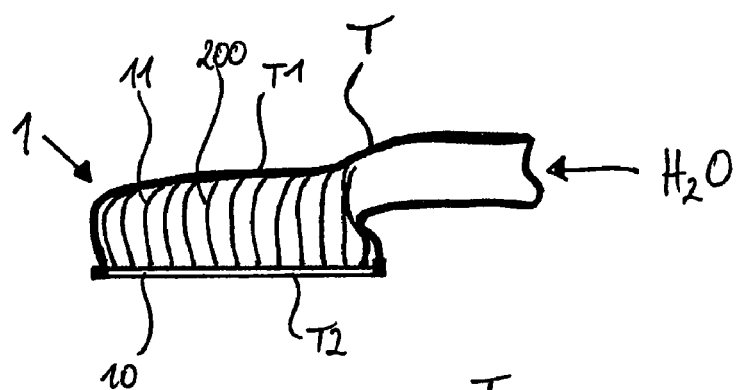
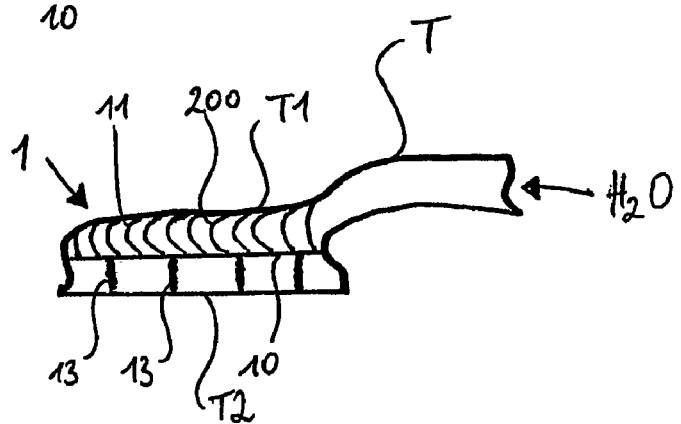

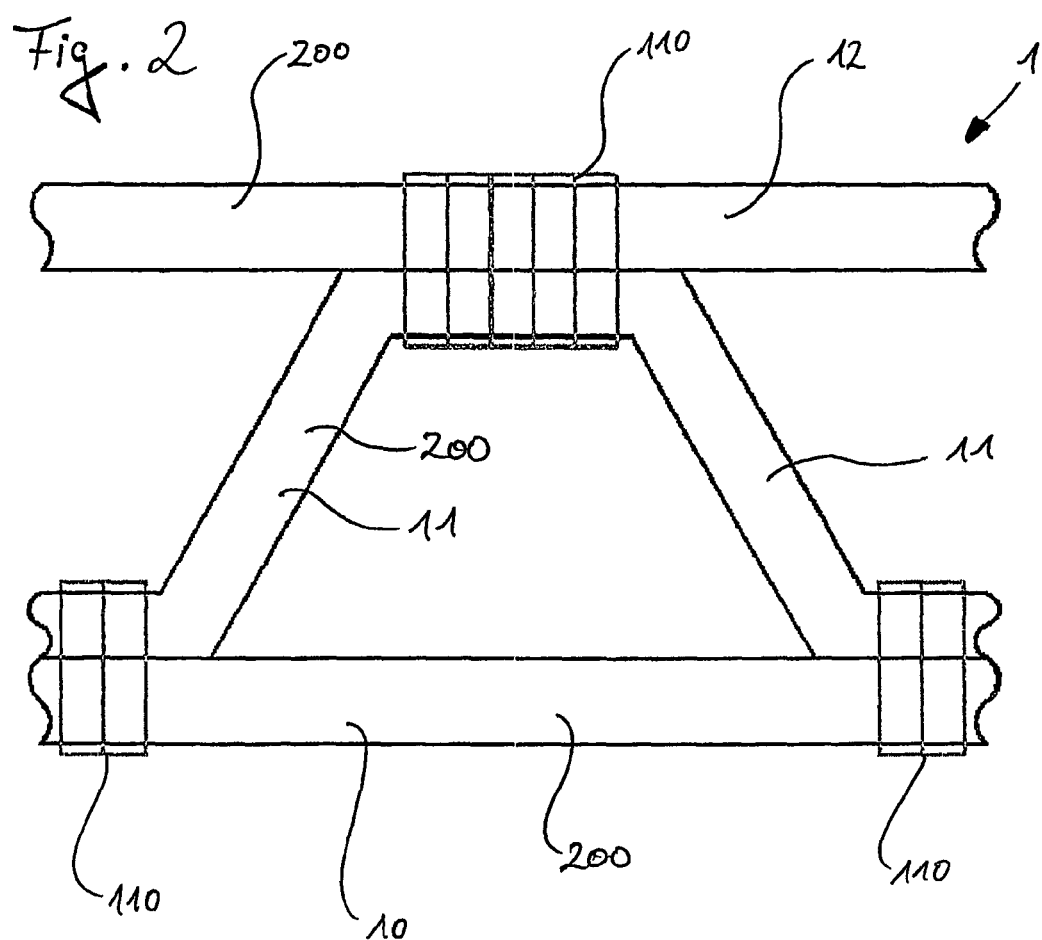

THREAD SYSTEM FOR INSTALLING IN DRINKING WATER SYSTEMS AND OTHER LIQUID-GUIDING SYSTEMS

CROSS REFERENCE TO RELATED APPLICATIONS

Applicant claims priority under 35 U.S.C. §119 of German Application No. 20 2004 015 240.1 filed Sep. 27, 2004. Applicant also claims priority under 35 U.S.C. §365 of PCT/DE2005/001730 filed Sep. 26, 2005. The international application under PCT article 21(2) was not published in English.

The invention relates to a thread system for installing in drinking water systems and other liquid-guiding systems according to the preamble of claim 1.

EU directive 98/83 defines drinking water as all water which is used as a foodstuff,
serves for body-cleaning purposes,
is used for cleaning articles which come into contact with foodstuffs or which, as intended, do not come into contact merely temporarily with the human body.

Drinking water systems and other liquid-guiding systems are understood, within the scope of this invention, to mean all systems which come into contact with drinking water according to the definition of EU directive 98/83 or with correspondingly other liquids.

According to the regulations of the German Infection Protection Law (IfSG), drinking water must be such that the use of drinking water does not cause harm to human health, in particular due to pathogens.

The water must fulfill both chemical and microbiological guidelines or limit values as regards drinking water quality. Thus, according to Drinking Water Regulations (TrinkwV), no pathogens should be contained in concentrations which may lead to harm to human health. For example, no Colibacteria (*Escherichia coli*), Enterococcae or coliform bacteria should be detected in 100 ml. As regards Legionellae (for example, *Legionella pneumophila*), in Germany, there is an agreement whereby sanitizing measures must be carried out from a count of 100 colony-forming units (KbE) per 100 ml.

Since the observance of the parameters refers to 100 ml of water, some bacteria may very well occur in larger quantities of drinking water, that is to say, even when microbiologically satisfactory drinking water is fed into the building installation from the water suppliers (waterworks), bacterial pathogens, even Legionellae, may grow and multiply under suitable conditions.

Each building or plant manager therefore has sole responsibility for the water quality to a tremendous degree.

The hot water supply presents particular problems with regard to the observance of microbiological parameters, since hot water contains bacteria pathogenic to humans in the temperature range of ideal conditions for multiplication (35 to 45° C. in the case of Legionellae).

Particularly critical are parts of the pipeline system in which the water sometimes stands for a relatively long time, such as extraction points (water taps, shower or sprinkler heads), since biofilms may occur here which greatly promote the growth of bacteria.

Whereas all the pathogens mentioned lead to the detriment of health, Legionellae must be classified as being particularly hazardous.

Legionnaire's disease (Legionellosis) caused by Legionellae often leads to serious disablements (invalidity) and sometimes ends in death and has been subject to a medical communication obligation in Germany since January 2001. The symptoms of Legionnaire's disease are very similar to those of common pulmonary inflammation, thus minimizing the chance of successful treatment based on early detection and possible only in the initial stage.

Infection by Legionellae mainly occurs by fine air droplets (aerosols) being breathed in, for example on shower or sprinkler heads, but also by air droplets occurring, for example, at water extraction points due to water splashes.

The most important conventional disinfection methods are:

thermal disinfection (thermal disinfection, on the one hand, is extremely cost-intensive and, on the other hand, the risk of severe scalding at a hot water temperature of at least 70° C. at the extraction points will be too high);

chemical disinfection or electrolytic disinfection with chlorine, hypochlorite or hypochlorous acid (chemical disinfection with chlorine, hypochlorite or hypochlorous acid is fundamentally risky in application and sometimes leaves behind toxic residues, so that the drinking water quality demanded at the extraction points would not be ensured), and radiating disinfection (for example, with UV light, ultrasound or microwaves); radiating disinfection can be carried out directly at the extraction points only with difficulty in practical terms and would then also be too costly and would not allow continuous disinfection directly at the extraction points.

None of these methods has hitherto been capable of ensuring freedom from pathogenic bacteria to a sufficient extent, effectively and at low maintenance costs. The most up-to-date publication on this was published in German Federal Construction Sheet BBB 3-2005, where four different sample systems for water disinfection were investigated in a long-term trial.

The development of Legionellae cultures is particularly assisted in the case of high stagnation times in installed pipe systems.

Repeatedly occurring instances of Legionellae infections, particularly in public institutions (hospitals), show that the methods and safety systems which have been developed hitherto and are in use do not always satisfy the requirements.

For example, DE 44 16 501 A1 describes a thread system with a multidimensional structure formed from at least one thread, the thread having in a moist environment a germicidal activity caused by oligodynamic metal fractions of the thread. This thread system, for example in the form of a woven fabric formed from silvered high-grade steel wires, performs both the function of a mechanical sieve and the function of a germicidal agent by the discharge of silver ions into the water flowing past.

The thread system is normally fixed in the drinking water stream transversely to the flow direction in order to perform the filter function. The silver ions discharged in this case are often not sufficient to kill germs located downstream, which are located, in particular, in colonies on biofilms. Moreover, the cross-sectional area of the thread system must be adapted to the throughflow cross-sectional area. With the large number of different cross-sectional areas which occur in practice, it is necessary in each case for the thread system to be cut to size.

The object on which the present invention is based, therefore, is to provide a thread system for installing in drinking water systems and other liquid-guiding systems, which ensures high effectiveness with respect to germs occurring in biofilms, can at the same time be used as universally as possible and can be produced cost-effectively.

This object is achieved by means of a thread system having the features of claim 1.

According to the invention, there is provision for the thread system to have a first sheet-like structure and for a multiplicity of spacer thread elements to extend transversely with respect to the sheet-like structure in such a way that the thread system forms an elastically deformable three-dimensional spacer structure, the thread with the germicidal activity being arranged in the sheet-like structure and/or in the region of the spacer thread elements.

The feature "transversely" with respect to the sheet-like structure embraces all angular positions between the sheet-like structure and the spacer thread elements in the entire range between 0° and 180°. Moreover, it goes without saying that the spacer thread elements do not necessarily run in a straight line, but may also be curved and intertwined. Furthermore, it is unimportant if the spacer thread elements run transversely, within the meaning of the above definition, only in portions and if other portions are arranged in the plane of the sheet-like structure.

On the one hand, it is conceivable that sheet-like structures and spacer thread elements are formed from one and the same thread. This variant can be produced by a suitable continuous method. It is likewise possible to produce the spacer thread elements from a thread other than the thread forming the sheet-like structure.

Within the scope of the invention, therefore, there is provision, on the one hand, for producing the thread system solely from the thread having germicidal activity or, on the other hand, for producing the thread system as a combination of at least one thread of germicidal activity with at least one thread without germicidal activity. In this case, the respective threads are arranged in the sheet-like structure and/or in the region of the spacer thread elements which lies adjacently to this or the sheet-like structure and/or the spacer thread elements are formed at least partially from the respective threads.

Spacer thread elements are understood here to mean, in the simplest instance, thread portions which have the necessary elasticity so that the thread system has the desired properties.

Alternatively, it is likewise conceivable that the spacer thread element also forms a specific spacer thread system. That is to say, the spacer thread element is itself constructed as a knitted, woven, contextured or interlaced element comprising at least one thread.

Of course, the thread system according to the invention also comprises the design variants which consist of a plurality of threads. Spacer thread elements oriented transversely with respect to the sheet-like structure form a three-dimensional spacer structure of the thread system.

The feature of elastic deformability is to be understood here as meaning that the thread system has a marked compressibility in relation to its dimensions transversely and, in particular, perpendicularly to the sheet-like structure. After deformation due to the action of force, the thread system endeavors, on account of the material properties of the deformed spacer thread elements, largely to assume the undeformed state again.

The elasticity properties described make it possible to use one and the same thread system in a multiplicity of different drinking water systems and other liquid-guiding systems. A volume unit of the thread system which is greater than the space volume present in the mounting region of the drinking water system is introduced, compressed, into the mounting region. The thread system can be expanded there, and it is clamped with the sheet-like structure and the spacer thread portions onto the wall portions of the drinking water system which delimit the space volume.

Thus, in particular, the stagnation regions, especially at risk, in drinking water systems and other liquid-guiding systems can be equipped along their entire length of extent with the thread system.

In this case, it is advantageous, in particular, that the thread system is pressed against the wall portions of the stagnation regions on account of its elasticity properties. Thus, the thread system comes into direct contact via its sheet-like structure and/or its spacer thread elements with the critical biofilms occurring particularly here.

Moreover, the thread system according to the invention can easily be made for different sizes. For this purpose, a plurality of thread systems can be connected to one another to form a coupled thread system. This takes place, for example, by stitching, adhesive bonding, welding or hooking together of the individual thread systems. The functionality of the coupled thread system then still always corresponds to that of the individual thread systems.

It goes without saying that the entire thread system must have, in particular, the required elasticity properties over the entire temperature range of the drinking water occurring in drinking water systems and other liquid-guiding systems of approximately 0° to 100° C. The materials are selected accordingly.

Oligodynamic metals are known to the relevant person skilled in the art here. These are semiprecious and precious metals, such as, for example, gold, silver and copper. However, zinc and nickel also have a corresponding activity. The metal fractions may in this case be provided either in metallic form as particles incorporated into the thread structure or as layers arranged on the thread. It is likewise conceivable to provide the metal fractions in suitable ionic form, for example as salts of said metals, in or on the thread.

The oligodynamic germicidal activity of the thread system is also ensured by contact reaction of bacteria on the surface of the thread having the germicidal activity. That is to say, in addition to the above-described action of the metal ions released into the water, the metal atoms or metal ions which are not dissolved and are present on the thread surface also contribute, when metal salts of low water solubility are used, to the overall oligodynamic effect of the thread system introduced in a drinking water system.

So that the throughput of drinking water is impeded only slightly, it is advantageous that the distance between adjacent spacer thread elements of the thread system is, on average, greater than 1 mm. Depending on the application, the "free" path length between the spacer thread elements may be made variable. The flow resistance depends, of course, on the flow velocity, so that, at very high flow velocities, spacings between spacer thread elements of markedly more than one millimeter are required.

In terms of compressibility, the spacer thread elements are preferably designed in such a way that the thread system can be compressed by at least 20% of its transverse extent in a direction transverse to the first sheet-like structure. The amount of possible compression depends, on the one hand, on the restoring forces of the compressed spacer thread elements. On the other hand, however, excessive compression may also be undesirable in light of the rising flow resistance of the compressed thread system.

The sheet-like structures are designed, in a way known from the prior art, particularly as an interlacing, contexture, woven or knitted fabric or as fiber flock elements. The sheet-like structure, due to its structure, makes it possible to detect a surface, with respect to which spacer thread elements extend transversely and thus, together with the sheet-like structure, form an elastically deformable three-dimensional spacer structure. That is not to say that the sheet-like structure has a purely two-dimensional design. This would even be untrue to reality, since a sheet-like textile structure, by virtue of its construction, must always have some extent transversely with respect to its area of extent.

An interlacing is understood to mean a sheet-like structure which occurs due to the crossing of interlaced thread systems running diagonally in opposite directions, the interlacing threads crossing one another at an adjustable angle with respect to the cloth edge.

A contexture is understood to mean a sheet-like structure consisting of one or more stretched thread systems, lying one above the other, of various orientation directions, with or without fixing of the crossing points.

A knitted fabric is a sheet-like structure, in which the stitches are formed individually and in succession from a horizontally presented thread. In addition, further thread systems may be incorporated in the warp and/or weft direction for reinforcement.

A woven fabric is a sheet-like structure which contains at least two thread systems which, as a rule, cross one another at right angles, a thread system running parallel to the edge.

A knitted fabric is also a sheet-like structure which is formed from one or more thread systems by the simultaneous formation of stitches in the longitudinal direction. In addition, further thread systems may be incorporated in the warp and/or weft direction for reinforcement.

Fiber flock elements are understood to mean sheet-like structures in which a sheet-like substrate is charged electrostatically, in order to arrange on it and permanently fix to it fibers of a defined cut length uniformly or in an intended systematic or random grid structure.

The spacer thread elements may be woven, knitted, adhesively bonded or stitched together with the sheet-like structures mentioned above. In this case, the spacer thread elements may either be in the form of a separate thread or be designed as a thread which is also arranged in the sheet-like structure.

In a preferred embodiment of the thread system, the thread system has a second sheet-like structure oriented essentially parallel to the first sheet-like structure, the spacer thread elements spacing the first and the second sheet-like structure apart from one another.

There are existing technologies for weaving and knitwear production whereby the overall spatial structure of a thread system having two adjacent sheet-like structures can be produced efficiently in one work process, for example as a spaced woven or knitted fabric. In this case, both a single thread and a combination of different threads may be employed. Within the scope of the invention, at least one thread must have the required germicidal activity.

As stated above, the second sheet-like structure may likewise be designed, in particular, as an interlacing, contexture, knitted or woven fabric or a fiber flock element.

The coupling of the spacer thread elements to the second sheet-like structure can be implemented correspondingly to the above-described coupling to the first sheet-like structure.

In a variant to the thread system, the complete thread system is produced from one and the same thread. This presupposes, however, that the single thread has the necessary elasticity properties for spacing apart the two sheet-like structures and suitable germicidal activity.

It is likewise conceivable that the two sheet-like structures are produced from an identical first thread and the spacer thread elements from a second thread. In this case, the first and/or the second thread can be equipped with the germicidal activity.

It applies to all the variants of the thread system which were described above that the at least one thread or one of the threads has a multifilament or monofilament textile metalized yarn.

Alternatively or additionally, it is possible that one thread or one of the threads is designed as a metallic thread. Fine wires, preferably made from high-grade steel, are considered here as metallic threads, that is to say a metallic thread consists entirely of metal. It is likewise conceivable, however, to employ a glass, basalt or carbon fiber with suitable properties in terms of elasticity and/or germicidal activity.

Furthermore, it is advantageous to design the thread system with fixing means for fastening the thread system in a drinking water system. Fixing means within the meaning of this embodiment are all systems, known from the prior art, which are suitable for fixing: clamping, adhesive bonding, hooking, touch-and-close fastenings, latches, screws, etc.

Finally, it may be stressed, with regard to the scope of protection claimed, that a thread system having the features of claim 1 is claimed, which is suitable from purely design-related considerations for installing in drinking water systems and other liquid-guiding systems according to the definition given in the description introduction. A restriction of the scope of protection by the requirement of licensing suitability from a legal standpoint in light of the many different national drinking water regulations should not be assumed here.

Further advantages and features of the invention are made clear in conjunction with the design variants illustrated and described in the following drawings in which:

FIG. 1d shows a diagrammatic cross section through a second embodiment of the thread system as a spacer structure comprising a sheet-like structure and stitch-like spacer thread elements oriented transversely with respect to the sheet-like structure;

FIG. 1e shows a cross-sectional view of the embodiment according to FIG. 1d with the variant of bristle-like spacer thread elements arranged essentially perpendicularly to the sheet-like structure;

FIG. 1f shows a diagrammatic cross section through a drinking water system in the form of a shower head with a thread system according to FIG. 1e arranged in the latter;

FIG. 1g shows a diagrammatic cross section through a shower head with a thread system according to FIG. 1e arranged in the latter, the thread system being fastened to the shower head by fixing means in the form of mechanical clamping devices, and FIG. 2 shows a third embodiment of the thread system as a spacer structure of two sheet-like structures of modular construction.

Figure 1A:
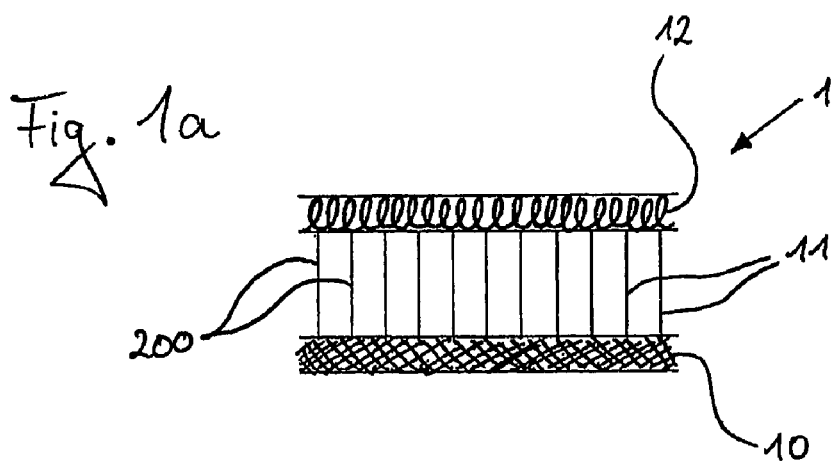
FIG. 1a shows a diagrammatic cross section through a first embodiment of the thread system as a spacer structure of two sheet-like structures with straight, vertically oriented spacer thread elements.

FIG. 1a shows a diagrammatic cross section through a first embodiment of the thread system 1 as a spacer structure of a first sheet-like structure 10 and of a second sheet-like structure 12. The first sheet-like structure 10 is illustrated diagrammatically in the form of a contexture consisting of a multiplicity of fibers. The shown stitches of the second sheet-like structure 12 are to illustrate diagrammatically a second sheet-like structure 12 designed as a knitted fabric. In principle, in each case contextures and knitted or woven fabrics, in all their variants known from the prior art, may be envisaged for forming the sheet-like structures 10, 12. In order to simplify the diagrammatic illustrations, the sheet-like structures 10, 12 of the variants and embodiments in the remaining figures are illustrated purely diagrammatically without the details of the threads arranged in them.

The two sheet-like structures 10, 12 are spaced apart via spacer thread elements 11. These, in this variant of the thread system 1, extend at right angles to the plane of extent of the two sheet-like structures 10, 12. It goes without saying that at least the material properties of the spacer thread elements 11 must be such that a shearing or compression of the spacer structure is possible. In this case, the spacer thread elements 11 bend essentially parallel to one another to the right or to the left or the originally stretched spacer thread elements 11 are brought into a curved shape by deformation. In this case, the first sheet-like structure 10 approaches the second sheet-like structure 12. The deformation energy is ideally stored completely as potential energy of the bent spacer thread elements 11 in the spacer structure and can be retrieved again. Of course, a multiplicity of further angular positions, not shown here, of between 0° and 180° are possible with regard to the arrangement of the spacer thread elements and of the sheet-like structures.

The multidimensional structure of the thread system 1 is formed from a multiplicity of threads. At least one is provided as a thread 200 with germicidal activity. In the variant of the thread system, as shown in FIG. 1a, the thread 200 with germicidal activity is arranged in the region of the spacer thread elements 11. This, on the one hand, may be implemented such that the germicidal thread 200, in addition to its oligodynamic activity, assumes at the same time the function of a spacer thread element. It is likewise possible that the germicidal thread 200 is arranged next to a spacer thread element 11 having the elasticity properties required for the spacer structure. This arrangement may be implemented, spaced apart, or the spacer thread element 11 and the germicidal thread 200 are processed jointly in the form of a yarn or of a twine. Of course, it is likewise possible, alternatively or additionally, to arrange threads with germicidal properties in the region of the sheet-like structures 10, 12. These variants are described in conjunction with the following figures.

Figure 1B:
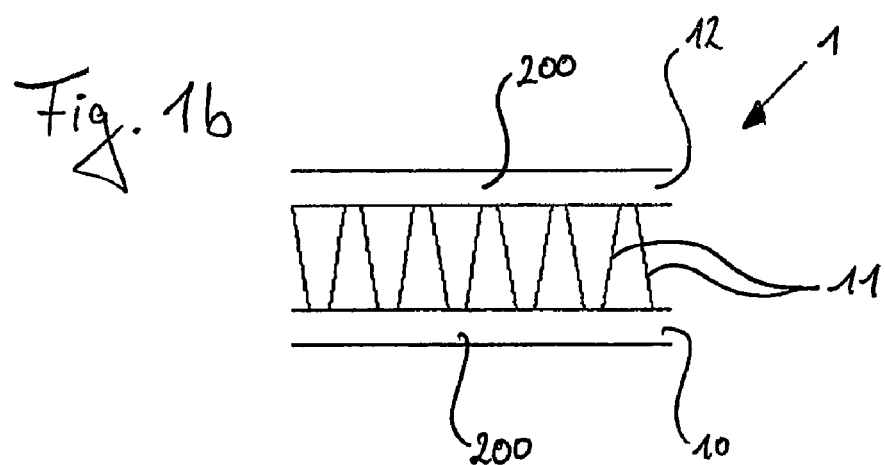
FIG. 1b shows a cross-sectional view of the embodiment according to FIG. 1a with the variant of obliquely oriented spacer thread elements.
Figure 1C:
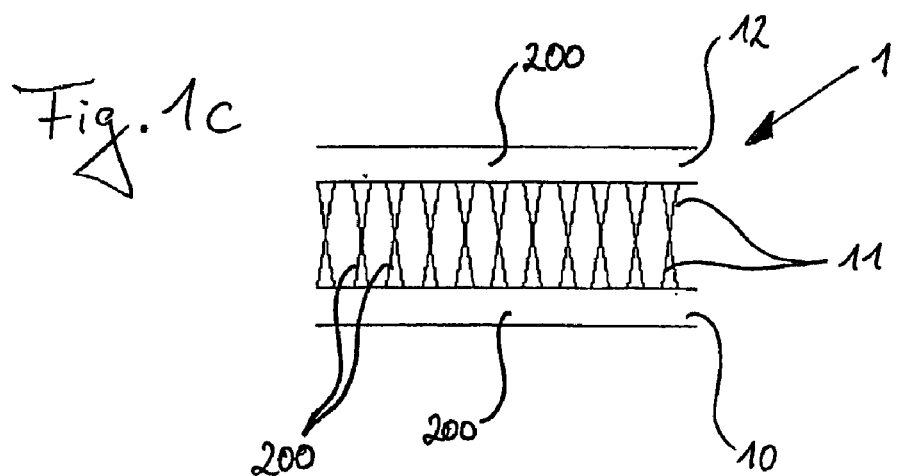
FIG. 1c shows a cross-sectional view of the embodiment according to FIG. 1a with the variant of crossed obliquely oriented spacer thread elements.

It goes without saying that the geometrical orientation of the spacer thread elements 11 may have a multiplicity of different variants. FIGS. 1b and 1c illustrate two further variants in a cross-sectional view corresponding to FIG. 1a.

FIG. 1b shows an arrangement in which the spacer thread elements 11 run between the first sheet-like structure 10 and the second sheet-like structure 12, differently from a perpendicular orientation, slightly obliquely at an angle greater than 80°. Here, the germicidal thread 200 is provided solely in the two sheet-like structures 10, 12.

Moreover, it is conceivable that the spacer thread elements 11 are curved or, as shown in FIG. 1c, cross one another. It is essential in each case only that the desired elasticity of the thread system 1 is implemented, taking into account the weight force of the sheet-like structures 10, 12 and the material properties of the spacer thread elements 11.

Moreover, the orientation of the spacer thread elements 11 between the first sheet-like structure 10 and the second sheet-like structure 12 depends on how the linkage between the sheet-like structures and the spacer thread elements 11 has been made. This may take place, in particular, by knotting, adhesive bonding, welding, knitting or hooking.

FIG. 1d shows a second embodiment of the thread system. A single sheet-like structure 10 is provided, for the formation of which the statements made as regards FIG. 1a apply correspondingly. Spacer thread elements 11 in stitch-like form run transversely, in this case perpendicularly or virtually perpendicularly, with respect to the plane of extent of the sheet-like structure 10. These stitches have the corresponding elastic properties, so that the three-dimensional spacer structure can be compressed as a result of deformation of the stitches.

The same applies correspondingly to the variant, shown in FIG. 1e, of the second embodiment of the thread system. In contrast to the first variant from FIG. 1d, the spacer thread elements 11 are provided in the form of individual stretched thread portions. These thread portions run essentially perpendicularly with respect to the plane of extent of the sheet-like structure 10, so that the thread system 1 is of brush-shaped design.

For both variants of the second embodiment of the thread system, it is applicable, correspondingly to the statements relating to FIG. 1a, that the germicidal thread 200 may be provided in the sheet-like structure 10 and/or in the region of the spacer thread elements 11. The other statements regarding the arrangement and processing of the germicidal thread 200, together with the illustrations from FIGS. 1a to 1c, apply accordingly here.

As an application of the thread system to FIG. 1e which is to be understood purely as an example, the cross section of a drinking water system T in the form of a shower head is illustrated diagrammatically in FIGS. 1f and 1g. It can be seen how a thread system 1 is arranged inside the shower head. The shower head cavity extending between the walls T1 and the water outlet plate T2 has spacer thread elements 11 of a thread system 1 passing through it. The sheet-like structure 10 of the thread system 1 in this case comes to lie on the water outlet plate T2 and has a correspondingly coarse-stitch design, in order to oppose sufficiently low flow resistance to the water passing through. The distance between the plane of the sheet-like structure 10 and the opposite wall T1 is smaller than the length of the individual spacer thread elements 11. As a result, the thread system 1 can be introduced into the shower head only under some compression of the spacer thread elements 11. This ensures that the elastically deformed spacer thread elements 11 press against the wall T1 of the shower head. Since the spacer thread elements 11 are equipped with a germicidal thread 200, this ensures microbicidal interaction between the thread system and a biofilm which, in particular, is formed on the wall T1.

If the three-dimensional volume of the compressed thread system 1 is not sufficient to fill a cavity of a drinking water system T through which water flows, or if a fixing of the thread system 1 in this cavity is to be ensured, then this can be ensured by fixing means. These fixing means may be designed, for example, as shown in FIG. 1g, in the form of mechanical clamping devices 13. As shown by way of example, these are designed as compression springs which ensure the desired fit of the thread system 1 in the drinking water system T.

The spacer thread elements 11 of the embodiments described hitherto and of their variants may, in the simplest instance, be designed as portions of a thread consisting of a yarn or of a twine, which have the required elasticity properties. It is likewise conceivable, however, to design the spacer thread elements 11 themselves as specific spacer thread systems. These may be provided as woven, knitted, contextured or interlaced elements with one or more threads and conform in their construction, for example, to the variants shown in FIGS. 1a to 1e.

Such an exemplary embodiment is illustrated diagrammatically in FIG. 2 as a third embodiment of the thread system 1. The first sheet-like structure 10 and the second sheet-like structure 12 are spaced apart from one another here by spacer thread elements 11 running in a trapezium-like manner and in the form of an abovementioned spacer thread system. The linking of the spacer thread systems to the two sheet-like structures 10, 12 takes place, here, by separate stitching by means of a stitching thread 110. Alternatively to stitching, adhesive bonding or welding could likewise be envisaged.

Finally, it is emphasized that the arrangement of the thread having the germicidal activity in the thread system is independent of the construction of the thread system 1.

For any of the variants described above, the germicidal thread may be arranged in the sheet-like structures and/or in the region of the spacer thread elements. For this purpose, it is possible that the germicidal thread is at least partially an integral part of the structure of the sheet-like structure and/or of the spacer thread elements. For this purpose, the germicidal thread may, in the form of a yarn or a twine, have the mechanical and elastic properties necessary for the respective structure. It is likewise conceivable that the germicidal thread is incorporated into the sheet-like structure and/or the thread spacer elements as a thread structure independent of the structures of the sheet-like structure and of the spacer thread elements.

The subject of the invention, of course, also embraces mixed forms of the variants mentioned above.

The invention claimed is:

1. A thread system for installing in drinking water systems and other liquid-guiding systems, with a multidimensional structure, formed from at least one thread, the at least one thread having, in a moist environment, a germicidal activity caused by oligodynamic metal fractions of the thread,
wherein the thread system has a first sheet-like textile structure,
wherein a multiplicity of textile spacer thread elements extend transversely with respect to the first sheet-like textile structure in such a way that the thread system forms an elastically compressible three-dimensional spacer structure, and
wherein the at least one thread is arranged in the first sheet-like textile structure, is arranged in the region of the textile spacer thread elements, or is arranged both in the first sheet-like textile structure and in the region of the textile spacer thread elements.

2. The thread system as claimed in claim 1, wherein the distance between adjacent textile spacer thread elements of the thread system is, on average, greater than 1 mm.

3. The thread system as claimed in claim 1, wherein the textile spacer thread elements are designed in such a way that the thread system can be compressed to at least 20% of its extent in a direction transverse to the first sheet-like textile structure.

4. The thread system as claimed in claim 1, wherein the first sheet-like textile structure is designed as an interlacing, contexture or woven or knitted fabric.

5. The thread system as claimed in claim 1, wherein the thread system has a second sheet-like textile structure oriented essentially parallel to the first sheet-like textile structure, the textile spacer thread elements spacing the first and the second sheet-like textile structures apart from one another.

6. The thread system as claimed in claim 5, wherein the second sheet-like textile structure is designed as an interlacing, contexture or knitted or woven fabric.

7. The thread system as claimed in claim 5, wherein the entire thread system is formed from the same thread.

8. The thread system as claimed in claim 5, wherein the first and the second sheet-like textile structures are formed from a first thread and the textile spacer thread elements are formed from a second thread, and
wherein at least one of the first thread and the second thread has a germicidal activity.

9. The thread system as claimed in claim 1, wherein the at least one thread with germicidal activity has a multifilament or monofilament textile metalized yarn.

10. The thread system as claimed in claim 1, wherein the at least one thread is designed as a metallic thread.

11. The thread system as claimed in claim 1, wherein the thread system has a fixing element for fastening the thread system in a drinking water system.

12. The thread system as claimed in claim 11, wherein the fixing element is designed as a mechanical clamping device for fixing the thread system counter to a flow force of the drinking water in the drinking water system.

* * * * *